(No Model.)

M. W. & J. DE WITT KASE.
TAG.

No. 295,557. Patented Mar. 25, 1884.

Witnesses:
E. G. Hoffman
W. P. Kase

Inventor:
Matthew Wheeler Kase,
James DeWitt Kase

United States Patent Office.

MATTHEW WHEELER KASE AND JAMES DE WITT KASE, OF DANVILLE, PA.

TAG.

SPECIFICATION forming part of Letters Patent No. 295,557, dated March 25, 1884.

Application filed November 7, 1883. (No model.)

*To all whom it may concern:*

Be it known that we, MATTHEW WHEELER KASE and JAMES DE WITT KASE, citizens of the United States, residing at Danville, in the county of Montour and State of Pennsylvania, have invented certain new and useful Improvements in Tags, which improvements are fully set forth in the following specification and accompanying drawings, in which—

Figure 0:
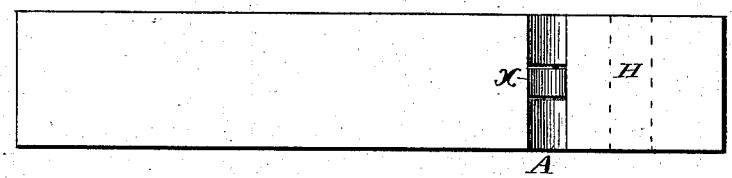
Figure 1:
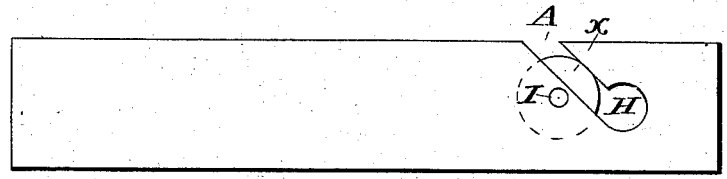
Figure 2:
Figure 3:
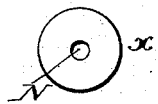
Figure 4:
Figure 5:
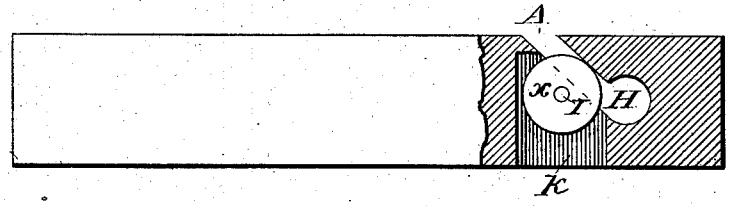

Figure 0 is a top view of tag, showing opening A, through which a loop of rope, cord, or twine is admitted, and an exposed part of rubber disk X as held in place. Fig. 1 is a side view of a tag, showing the oblique slot A, terminating in a rounded perforation or hole, H, for permanently holding the cord or twine, and an exposed part of side of rubber disk X, also the head of nail or pin I, which holds the disk X in place. Fig. 2 is a back view of Fig. 1, showing opening K, through and in which the rubber disk X is admitted to its proper position. Fig. 3 is a side view of rubber disk X, with rounded perforation or hole N in center, for admission of a nail or pin, I. Fig. 4 is a view of nail or pin which is used for holding the rubber disk X securely in place by passing through the sides of frame and the disk X, as also shown in Fig. 1. Fig. 5 is a bisected view of the tag, showing the position of the rubber disk X when secured in place by pin I, and opening K, oblique slot A, and rounded perforation or hole H.

Like letters indicate like parts throughout the several views.

It will be seen from the foregoing that when the tag is being hooked on a loop of cord or twine the rubber disk X is depressed and rotates when the cord or twine passes down through slot A to perforation or hole H. After the cord or twine is passed into rounded perforation H, the rubber disk X resumes its shape, and therefore fills up the oblique slot A, securing in place in the perforation or hole H the cord or twine, so that said tag will remain on said cord or twine until such time as its removal is required, when an action similar to that required in hooking it on will release it.

Having thus described our invention, what we claim as new, and desire to secure by Letters Patent, is—

The herein-described rotary rubber disk, applied in combination with a slotted tag, and pivoted in such slot, all substantially as set forth.

In witness whereof we affix our signatures in presence of two witnesses.

MATTHEW WHEELER KASE.
JAMES DE WITT KASE.

Witnesses:
WM. C. FRICK,
E. G. HOFFMAN.